US010515077B2

(12) United States Patent
Kaushik et al.

(10) Patent No.: US 10,515,077 B2
(45) Date of Patent: Dec. 24, 2019

(54) EXECUTION OPTIMIZATION OF DATABASE STATEMENTS INVOLVING ENCRYPTED DATA

(71) Applicant: Microsoft Technology Licensing, LLC, Redmond, WA (US)

(72) Inventors: Raghav Kaushik, Kirkland, WA (US); Aditya Nigam, Kirkland, WA (US); Arvind Arasu, Redmond, WA (US); Donald Alan Kossmann, Kirkland, WA (US); Kenneth Eguro, Seattle, WA (US); Nikhil Vithlani, Seattle, WA (US); Panagiotis Antonopoulos, Redmond, WA (US); Ravi Ramamurthy, Redmond, WA (US); Michael Zwilling, Seattle, WA (US); Cesar Galindo-Legaria, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 15/623,068

(22) Filed: Jun. 14, 2017

(65) Prior Publication Data

US 2018/0365290 A1 Dec. 20, 2018

(51) Int. Cl.
*G06F 17/30* (2006.01)
*G06F 16/2453* (2019.01)
(Continued)

(52) U.S. Cl.
CPC .... *G06F 16/24542* (2019.01); *G06F 16/2453* (2019.01); *G06F 16/24545* (2019.01);
(Continued)

(58) Field of Classification Search
CPC ......... G06F 16/24542; G06F 16/24545; G06F 16/2453; G06F 16/951; G06F 21/602; G06F 21/6245
See application file for complete search history.

(56) References Cited

U.S. PATENT DOCUMENTS 6,321,201 B1 * 11/2001 Dahl ................... G06F 21/6218
705/51
8,700,608 B2 * 4/2014 Belknap ............ G06F 16/24542
707/719

(Continued)

OTHER PUBLICATIONS

Raluca Ada Popel et al., CryptDB:Processing Queries on an Encrypted Database, Communications of ACM: vol. 55, Issue 9, pp. 103-111, Sep. 2012 (Year: 2012).*

(Continued)

*Primary Examiner* — Greta L Robinson
(74) *Attorney, Agent, or Firm* — Liang IP, PLLC

(57) ABSTRACT

Computer systems, devices, and associated methods of optimizing the execution of instructions of a database statement by a database server are disclosed herein. In one embodiment, a method includes identifying a potential execution plan for executing instructions of the database statement and estimating a cost for executing the execution plan. The cost can comprise an encrypted data processing cost associated with a operation in the execution plan of executing an operation on encrypted data in a protected computing environment. The method can include estimating the encrypted data processing cost in the protected computing environment based on statistics generated in the protected computing environment about a database table. In response to estimating the cost for executing the execution plan, comparing the cost to estimated costs of alternative execution plans, selecting the lowest-cost plan for execution, and executing the lowest-cost execution plan.

20 Claims, 9 Drawing Sheets

(51) Int. Cl.
*G06F 16/951* (2019.01)
*G06F 21/62* (2013.01)
*G06F 21/60* (2013.01)

(52) U.S. Cl.
CPC .......... *G06F 16/951* (2019.01); *G06F 21/602* (2013.01); *G06F 21/6245* (2013.01)

(56) References Cited

U.S. PATENT DOCUMENTS

| | | | | |
|---|---|---|---|---|
| 8,898,142 B2* | 11/2014 | Al-Omari | ......... | G06F 16/24542 707/713 |
| 9,003,204 B2* | 4/2015 | Haerterich | ............ | G06F 21/602 713/193 |
| 9,465,842 B2* | 10/2016 | Konik | ................ | G06F 16/24542 |
| 2004/0181521 A1* | 9/2004 | Simmen | ............ | G06F 16/24542 |
| 2008/0033960 A1* | 2/2008 | Banks | ................. | G06F 21/6227 |
| 2013/0268750 A1* | 10/2013 | Furukawa | ............ | G06F 21/6218 713/153 |
| 2014/0281511 A1* | 9/2014 | Kaushik | ................ | G06F 21/602 713/164 |
| 2015/0154255 A1* | 6/2015 | Cole | ................. | G06F 16/24542 707/718 |
| 2016/0232362 A1* | 8/2016 | Conway | .............. | G06F 16/2458 |
| 2016/0285623 A1* | 9/2016 | Yoon | ................... | G06F 21/6227 |
| 2016/0350375 A1* | 12/2016 | Das | ................... | G06F 16/24542 |
| 2018/0212932 A1* | 7/2018 | Novak | ................. | G06F 21/602 |

OTHER PUBLICATIONS

Wai Kit Wong et al., Secure Query Processing with Data Interoperability in a Cloud Database Environment, SIGMOND' 14: Proceedings of the 2014 ACM SIGMOND International Conference on Management of Data, pp. 1395-1406, Jun. 2014 (Year: 2014).*

Bajaj, et al., "TrustedDB: A Trusted Hardware-Based Database With Privacy and Data Confidentiality", In Proceedings of IEEE Transactions on Knowledge and Data Engineering, vol. 26, Issue 3, Mar. 1, 2014, 14 Pages.

"International Search Report and Written Opinion Issued in PCT Application No. PCT/US18/035234", dated Jul. 26, 2018, 12 pages.

* cited by examiner

EXECUTION OPTIMIZATION OF DATABASE STATEMENTS INVOLVING ENCRYPTED DATA

BACKGROUND

Organizations, governments, and other entities can store records of information in databases hosted on remote database servers, which ensure that the records are easily and quickly accessible for providing a designed user experience. Some of the records stored in remote databases may contain personal user information or other restricted data. For example, a health care website can store client names, social security numbers, health histories or other sensitive information of customers in a remote database. However, being rich sources of data, malware software, hackers, or unauthorized administrators may target such remote databases, wishing to access data hosted on the remote database servers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A remote database server (e.g., a Structured Query Language or "SQL" server) can provide database services for a client application. These services can include, for example, retrieving data that is stored in a database hosted on the remote database server at the request of the client application. The remote database server can provide suitable database services to the client application in response to corresponding database statements received from the client application. For example, the remote database server can analyze a database statement, identify instructions in the statement, and execute the instructions to provide requested services. In executing the instructions, the remote database server may perform suitable database operations on data stored in the database. Example database operations can include, for instance, comparing data values, evaluating logic statements, and executing computations on the data.

In order to provide database services, the remote database server expends time and computing resources to execute instructions related to database statements. These costs are generally not fixed for a database statement, but instead can vary significantly among various ways of executing the database statement. For instance, a component of total cost for executing instructions of a database statement can include time spent searching a table for data described in the database statement. Depending on how the remote database server executes the instructions in the database statement, the remote database server can spend as little as a fraction of a second or as long as an hour finding data described by the database statement.

In certain implementations, the remote database server can utilize a statement optimizer for minimizing cost associated with executing database statements. The statement optimizer can identify and compare several possible ways of executing instructions in the database statement, estimate a likely cost for executing each option, and select one option for execution based on certain criteria. Each of the possible ways of executing the instructions in the database statement can comprise an execution plan, which is an ordered set of operations to execute the database statement. The execution plan can comprise, for example, a query plan for accessing data in the database. Accordingly, the statement optimizer can analyze the database statement and provide the database server with an execution plan for executing the instructions related to the database statement.

The cost for executing a database statement according to an execution plan can comprise a numeric measure representing estimated resource usage. In some embodiments, the estimated cost for executing the database statement is correlated with an estimated time of executing the database statement. The statement optimizer can estimate the cost for the execution plan based on various factors, including, for example, anticipated system resources (e.g., CPU and/or memory usage), anticipated number of rows returned (i.e., cardinality), a size of an initial data set, distribution of data in the database, or access structures. These factors may represent physical costs associated with searching for data in a storage medium, as instructed in a database statement. For example, in searching a database comprising a magnetic storage device, time may be expended moving a magnetic head for reading data and comparing the data to a value in the database statement.

The statement optimizer can build and maintain statistics about the database tables and individual columns therein. When a database statement is received from the client application, the statement optimizer can use the maintained statistics to estimate the cost of executing the database statement according to any execution plan. For example, "cardinality" represents a uniqueness of data values in a column, and can therefore be used to estimate the number of rows that would be returned by an operation on the column according to a predicate in the database statement. The statement optimizer can estimate a cardinality of an operation based on the number of distinct values in a column relative to the total number of rows in the column. When, for instance, a column includes 100 total rows and 50 distinct values, the statement optimizer can estimate the cardinality of the result set to be two. On the other hand, when the column includes two distinct values, the query optimizer can estimate the cardinality of the result set to be 50. By comparing estimated cardinality values associated with predicates of a database statement, the statement optimizer can identify an estimated lowest-cost order for executing the predicates.

The foregoing execution optimization technique, however, may be ineffective or impractical when the database contains data in encrypted columns. One technique for encrypting data stored in a database is to encrypt individual columns of a table in the database. According to this technique, known as column-level encryption, the client application can encrypt data containing restricted information prior to transmitting the data to the database server for storage. For example, a column containing social security number of customers may be encrypted for security reasons. In other examples, columns containing names, addresses, gender, or other suitable information may also be encrypted. The keys used to encrypt/decrypt the data in the encrypted columns are typically maintained by the client application, and not revealed to the remote database server.

Column-level encryption can provide security to stored data containing restricted information, but can also limit database operations that may be performed on the encrypted data. In certain implementations, data of restricted information can be encrypted using deterministic or probabilistic encryption. According to deterministic encryption, a set of original data encrypted with an encryption key according to a selected encryption heuristics always results in the same encrypted data. On the other hand, according to probabilistic encryption, a set of original data encrypted with an encryption key according to a selected encryption algorithm may result in different encrypted data. A database server cannot perform operations on stored data encrypted according to a probabilistic encryption scheme. Performing database operations on data encrypted according to a deterministic encryption scheme is limited to only simple operations such as equality and equijoin. Accordingly, the statement optimizer may be limited or even prevented in gathering sufficient statistics related to data in encrypted columns to accurately estimate the cost of processing a database statement comprising encrypted data.

Several embodiments of the disclosed technology can build and maintain statistics of data in encrypted columns in a table of a database by utilizing a trusted machine in a protected computing environment. In certain embodiments, the remote database server can be logically divided into a trusted machine operating in the protected computing environment and an untrusted machine that is connected to a data store. The trusted machine can include components configured to decrypt encrypted data and execute a predicate involving data in the encrypted column or perform other database operations on the decrypted data in the protected computing environment. Examples of a protected computing environment can be provided by software guard extensions that can include a set of instructions that allow user-level code to allocate private regions of memory that is protected from higher-level processes. One example software guard extension is the Intel SGX provided by Intel Corporation of Santa Clara, Calif. Thus, a higher-level process such as a hypervisor or operating system would not have access to any decrypted data in the allocated private regions of the memory on the database server.

The trusted machine can include a column processor configured to build or maintain statistics related to data in encrypted columns of a table in the database. The statistics may enable the trusted machine to quickly estimate a cost associated with evaluation of an operation of an execution plan. In certain embodiments, the column processor can be configured to receive values of an encrypted column from the untrusted machine, decrypt the values of the encrypted column, and generate statistics based on the decrypted values. The statistics can include, for example, a quantity of distinct values in the column and a total number of rows in the column. In other embodiments, the column processor can be configured to generate a histogram based on the statistics. The column processor may also be configured to sort the values in the column for estimating a cost metric. In further embodiments, the column processor may also be configured to create and maintain an index for searching an encrypted column.

Using statistics built or maintained by the trusted machine, the statement optimizer executing in the untrusted machine can more accurately estimate a cost for processing a database statement that involves data in the encrypted column. As such, the statement optimizer can select a plan associated with the lowest cost for execution or other suitable criteria. For example, the statement optimizer can be configured to estimate a cost for an execution plan based at least in part on an encrypted data processing cost associated with executing an operation of the plan in the trusted machine. In some embodiments, the encrypted data processing cost includes a cardinality estimate generated by the trusted machine. For instance, when estimating the cost of the statement plan, the statement optimizer can request a cardinality estimate by the trusted machine for the encrypted column involved in a predicate. The trusted machine can be configured to refer to statistics built and maintained regarding the encrypted column, and estimate the cardinality of the encrypted column according to the statistics. In other embodiments, the statement optimizer can also factor into an estimated total cost for an execution plan an estimated cost for offloading processing of encrypted data of a database statement to the trusted machine. As such, the accuracy of the estimated total cost of the execution plan can be improved.

Several embodiments of the disclosed technology can more accurately estimate a total cost of executing instructions related to a database statement involving data in encrypted columns than other techniques. By utilizing the column processor in the trusted machine, statistics of data in encrypted columns can be accurately generated and/or maintained while restricted information contained in the data is not exposed to higher-level processes in the untrusted machine. As such, operations involving execution of database statements in the remote database server may be improved.

DETAILED DESCRIPTION

Figure 1A:
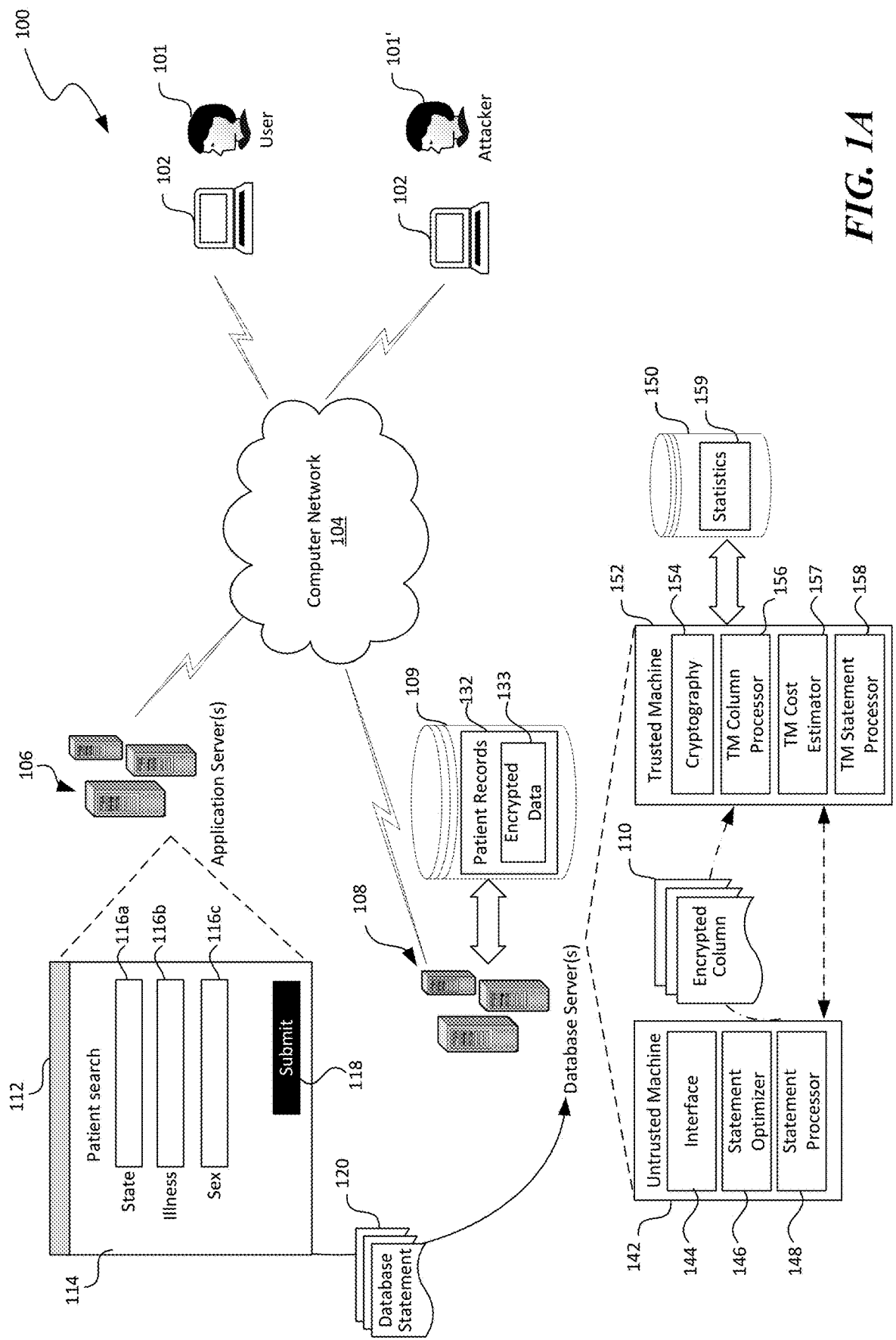
FIGS. 1A-1F are schematic diagrams illustrating a computing system implementing execution plan optimization for a database statement comprising encrypted data during stages of operation in accordance with embodiments of the disclosed technology.

Certain embodiments of systems, devices, components, modules, routines, data structures, and processes for execution optimization of database statements involving encrypted data are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-4.

As used herein, a "database statement" generally refers to a structured statement executable in a database for performing certain requested action(s). For instance, a database statement can request retrieval of certain records in a database based on one or more queries. Also used herein, the term "predicate" generally refers to an instruction in a database statement for limiting the rows that are affected by the database statement. For example, the database statement can comprise a query and a predicate may limit the rows of a column that are returned when the query is executed. Also used herein, the term "expression" generally refers to a combination of values, operators, and functions that evaluate to a value (e.g., a scalar value). One example expression can include a predicate in a database statement. The following is an example SQL statement:

UPDATE accounts SET balance=balance*1.025 WHERE account_age>5;

As shown above, the example database statement includes an expression, "balance*1.025," and a predicate, "account_age>5." Evaluating the example expression includes computing a value for rows of column balance, and evaluating whether a value for column account_age is greater than a value of 5, which results in a Boolean value for each comparison of the predicate. Accordingly, the predicate limits the rows that are updated to those that have a value for column account_age that is greater than a value of 5.

As used herein, the term "cost" generally refers to an estimate representing predicted resource usage for executing instructions included in a database statement according to an execution plan. A cost can include component costs respectively associated with operations of the execution plan and be expressed as a numerical, Boolean, or other suitable types of values. As used herein, an "encrypted data processing cost," which may be a component cost, generally refers to a cost associated with processing at least one operation of an execution plan in a protected computing environment. For example, the encrypted data processing cost can comprise a cardinality estimate. As used herein, an "execution plan" generally refers to ordered operations for performing instructions related to a database statement. An operation of the ordered operations can comprise an operation to be executed by the database server. The execution plan can comprise a query plan for accessing data in a table of a database.

As used herein, the term "protected computing environment" generally refers to a secure mode of processing data such that data being processed and information related to the processing is not revealed to other processes, including processes running at a higher privilege level on the same server or other suitable types of computing device. One example of a protected computing environment can be provided by software guard extensions such as Intel SGX provided by Intel Corporation of Santa Clara, Calif. As another example, a protected computing environment can comprise a Virtual Secure Mode (VSM) that is segregated from an operating system of a server by a hypervisor that sits on a hardware layer of the server.

Also used herein, "parsing" a database statement generally refers to examining characters in a database statement and recognizing commands, string literals, and comments by detecting keywords and identifiers and matching an overall structure of the database statement to a set of syntax rules applicable to the database. Further used herein, an "index" generally refers to a map of index pointers to row locations in a table. An index can comprise, for example, a range pointer, a bitmap pointer, a hash pointer, or other suitable types of index pointers.

As used herein, the term "restricted data" generally refers to data that is to be encrypted for transmission and storage. For example, restricted data can include encrypted data using encryption keys that are unavailable to an untrusted machine but available to a client application and a trusted machine. For example, certain types of data may be restricted, including personal information (e.g., social security numbers), financial data, or other private data. As used herein, the term "key" generally refers to a cryptographic key used to encrypt or decrypt data. A key can be symmetric or asymmetric depending on the implementation. As used herein, the term "content" of an expression generally refers to data included in an expression of a database statement or referenced by the expression, and data retrieved from a database, used for evaluation of the expression. For example, in the example database statement above, content of the expression includes a value for "balance." As used herein, the term "encrypted data" of an expression generally refers to content of an expression that is encrypted. For example, encrypted data of a predicate can comprise values of an encrypted column used for evaluating the predicate.

FIGS. 1A-1F are schematic diagrams illustrating a computing system 100 implementing execution plan optimization for a database statement involving encrypted data during stages of operation in accordance with embodiments of the disclosed technology. As shown in FIG. 1A, the computing system 100 can include an application server 106, a database server 108, multiple client devices 102 interconnected by a computer network 104. The computer network 104 can include an enterprise intranet, a wide area network, the Internet, or other suitable types of network. Even though particular components and associated arrangements of the computing system 100 are shown in FIGS. 1A-1F, in other embodiments, the computing system 100 can include additional and/or different components. For example, in certain embodiments, the application server 106 and the database server 108 can be interconnected via another computer network (not shown), contain multiple servers, and/or be integrated into a single computing facility. In other embodiments, the computing system 100 can also include caching servers, load balancers, or other suitable components.

FIGS. 1A-1F illustrate certain hardware/software components of the database server 108 in accordance with embodiments of the disclosed technology. In FIGS. 1A-1F, and in other Figures herein, individual software components, objects, classes, modules, and routines may be a computer program, procedure, or process written as source code in C, C++, C#, Java, and/or other suitable programming languages. A component can include, without limitation, one or more modules, objects, classes, routines, properties, processes, threads, executables, libraries, or other components. Components may be in source or binary form. Components can include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components can include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

In the description below, techniques of optimizing processing of a database statement involving encrypted data are described as implemented on the database server 108 for illustration purposes. In other embodiments, some or all of the techniques disclosed herein can also be implemented on one or more other servers in the computing system 100. For example, some or all of the techniques disclosed herein may be implemented on a proxy server (not shown) interconnected between the application server 106 and the database server 108 via the computer network 104.

The application server 106 can be configured to execute one or more applications 112 configured to facilitate retrieving or otherwise interacting with records (e.g., patient records 132) in a database 109 provided by the database server 108. As shown in FIG. 1A, the application 112 can include components configured to create a database statement 120 for accessing data in the database 109 based on user input to, for example, locate a patient record 132 in the database 109. The application 112 can be configured to provide a user interface, for example, a webpage 114 to the user 101 upon request. In the illustrated example in FIG. 1A, the webpage 114 contains input fields 116 and a submit button 118. The input fields 116 can be configured to receive a user input containing a numerical, string, or other suitable types of value. In some embodiments, the application 112 can also include an electronic commerce application, online financial exchange, or other suitable types of application.

The client devices 102 can individually include a computing device that facilitates access to the application server 106 via the computer network 104 by users 101 (identified as a user 101 and an attacker 101'). In the illustrative embodiment, the client devices 102 include laptop computers. In other embodiments, the client devices 102 can also include smartphones or other suitable computing devices. Even though two users 101 are shown in FIGS. 1A-1F for illustration purposes, in other embodiments, the computing system 100 can facilitate any suitable number of users 101 to access the application server 106 via the computer network 104.

The database server 108 can include one or more processors coupled to a memory containing instructions executable by the one or more processors to cause the processors to provide certain functional components. For example, as shown in FIGS. 1A-1F, the database server 108 can include an untrusted machine 142 interconnected with a database 109 and a trusted machine 152 operatively coupled to the untrusted machine 142. The trusted machine 152 can reside in a protected computing environment that is secure from the untrusted machine 142. In one embodiment, all of the foregoing components can reside on a single computing device (e.g., the database server 108). In other embodiments, the foregoing components can also reside on a plurality of distinct computing devices such as servers in a datacenter. In further embodiments, the components may also include network components and/or other suitable modules or components (not shown).

As shown in FIG. 1A, the untrusted machine 142 can include an interface component 144, a statement optimizer 146, and a statement processor 148 operatively coupled to one another. The interface component 144 can be configured to receive database statements 120 from the application 112 at the application server 106. The interface component 144 can also be configured to provide statement results 129 (shown in FIG. 1F) to the application 112. The statement results 129 are generated based on the patient records 132 in the database 109 in response to the database statement 120. In certain embodiments, the interface component 144 can include a network interface module with suitable firmware or software to perform the foregoing operations. In other embodiments, the interface component 144 can include other suitable types of communications modules.

The statement optimizer 146 can be configured to generate and maintain statistics associated with data in the individual columns of the database 109 containing the patient records 132. Such statistics can be used for determining an estimated lowest-cost execution plan for processing the database statement 120 when the database statement 120 includes an expression for evaluation of data in an encrypted column in the database 109. For example, the statement optimizer 146 can be configured to generate statistics that can be used for estimating a cardinality associated with evaluating a predicate in the database statement 120. These statistics can include, for example, a quantity of distinct values in a column and a total number of rows in the column. Additionally, the statement optimizer 146 can also be configured to generate statistics for calculating a selectivity of a predicate. For example, the statistics can comprise a histogram showing a distribution of different values of data in the column. The statement optimizer 146 can be configured to perform suitable operations on columns for building statistics, including, for example, sorting values in a column and comparing values in the column with one another. In some implementations, the statement optimizer 146 is configured to update statistics related to a column when a value in the column changes. In other implementations, the statement optimizer 146 periodically updates statistics associated with a column to reflect changes in the column in the database.

In certain embodiments, the statement optimizer 146 can be configured to create indexes that can be used for speeding up execution of the database statement 120. For example, the statement optimizer 146 can create an index that comprises a lookup table for locating data in a column. As another example, the statement optimizer 146 can be configured to create a hash index for searching buckets of rows. The statement optimizer 146 can be configured to generate the index based on values of the table in the database 109, for instance, containing the patient records 132.

The statement optimizer 146, however, may not be able to perform the foregoing operations on data in encrypted columns in the database 109. As shown in FIG. 1A, the statement optimizer 146 can be configured to identify an encrypted column 110 in the database 109 according to the database statement 120. The statement optimizer 146 can access patient records 132 in the database 109 and provide the encrypted column 110 comprising encrypted data 133 to the trusted machine 152 for generating and/or maintaining statistics associated with the encrypted column 110. In some embodiments, metadata associated with the encrypted column 110 includes an indication that the column is an encrypted column. In other embodiments, the metadata can also include indications of size, time last updated, or other suitable information regarding the encrypted column 110.

The statement processor 148 can be configured to perform various database operations for executing the execution plan. For example, the statement processor 148 can evaluate expressions, access patient records 132 in the database 109, and so forth. As described in more detail below with reference to FIG. 1D, the statement processor 148 can be configured to perform a statement execution procedure with the trusted machine 152 by offloading processing of encrypted data to the trusted machine 152. For example, as part of a statement execution process, the statement processor 148 can transfer rows 127 (shown in FIG. 1D) of encrypted data 134 to the trusted machine 152 for processing. The statement processor 148 can also transfer operations to the trusted machine 152 for execution. For example, the operations transferred to the trusted machine 152 for execution can comprise an expression comprising encrypted data for evaluation.

As shown in FIG. 1A, the trusted machine 152 can include a cryptography component 154, a trusted machine ("TM") column processor 156, a TM cost estimator 157, and a TM statement processor 158 operatively coupled to one another. Though particular components of the trusted machine 152 are shown in FIGS. 1A-1F, in other embodiments, the trusted machine 152 can include additional and/or different components. For example, the trusted machine 152 can include an interface component (not shown) configured to interface with the untrusted machine 142 and/or the application 112. An example interface component can include a network interface module with suitable firmware or software to perform the foregoing operations.

The cryptography component 154 can be configured to encrypt and decrypt restricted data using a cryptographic key shared between the cryptography component 154 and the application 112. For example, the cryptography component 154 can be configured to decrypt the restricted data contained in the encrypted column 110 received from the statement optimizer 154. The cryptography component 154 can then provide the decrypted data to the TM column processor 156 to generate statistics using the decrypted data.

The cryptographic key used for encrypting and decrypting the restricted data in the encrypted column 110 can be shared between the cryptography component 154 and the application 112. In some embodiments, the cryptography component 154 is configured to commence a key exchange procedure with the application 112 in response to receiving an indication from the application 112, via the untrusted machine 142, that the application 112 would like to transmit a database statement 120 involving encrypted data. For example, the database statement 120 can include a shell of a query by parameterizing the restricted contents. The application 112 may then transmit the database statement 120 to the untrusted machine 142 and request that the untrusted machine 142 compile the database statement 120. In response to receiving the database statement 120 comprising the parameterized contents, the untrusted machine 142 can be configured to request that the trusted machine 152 to process the database statement 120. In response to receiving the request from the untrusted machine 142 to process the database statement 120, the cryptography component 154 can be configured to commence a key exchange procedure with the application 112 if no keys yet exist. The cryptography component 154 and the application 112 can then exchange cryptographic keys using a Diffie-Hellman Key Exchange or other suitable exchange procedures.

In some embodiments, the cryptography component 154 can be configured to create a Column Encryption Key (CEK) for encrypting and decrypting values in columns and a Master Encryption Key (MEK) for securing the CEK. In some embodiments, the CEK is a symmetric key and the MEK is an asymmetric key. The cryptography component 154 may store an encrypted CEK and offload management of the MEK to an external entity, such as a Key Store Provider (not shown) that is configured to authenticate and provide access control for the MEK.

In other embodiments, the cryptography component 154 can store and access MEK metadata to access the MEK. For example, MEK metadata can include a key path, a key name, and a Key Store Provider name. The cryptography component 154 can be configured to encrypt (or decrypt) a CEK given plaintext (or ciphertext) of the CEK, a key path, a key name, and a Key Store Provider. The cryptography component 154 can be configured to provide the ciphertext of the CEK and the MEK metadata to the application 112, enabling the application to access the MEK at the Key Store Provider using the MEK metadata, in order to decrypt the CEK and use the CEK for encrypting or decrypting restricted data. In some embodiments, the application 112 is configured to generate the CEK, encrypt the CEK using a public key of the trusted machine 152 known to the application 112, and transmit the encrypted CEK to the trusted machine 152, which can then decrypt the CEK using a private key associated with the public key.

In response to decrypting restricted data in the encrypted column 110, the cryptography component 154 can be configured to provide the restricted data in decrypted form to the TM column processor 156 for further processing. The TM column processor 156 can be configured to generate statistics associated with the encrypted column 110. As shown in FIG. 1A, the TM column processor 156 can be configured to generate and store statistics 159 in a data storage 150. The TM column processor 156 can also be configured to regenerate statistics 159 when a change to a value of the encrypted column 110 is detected. For example, the statement optimizer 146 of the untrusted machine 142 can monitor columns of the database 109 and identify when a value in a column has changed. When a value in an encrypted column has changed, the statement optimizer 146 can be configured to provide the encrypted column 110, or a portion thereof, to the trusted machine 152 for re-computing statistics 159.

The TM column processor 156 can be configured to generate various types of statistics 159 of the data in the encrypted column 110. For example, the statistics 159 can comprise a quantity of distinct values in the encrypted column 110, a total number of rows in the encrypted column 110, a distribution of values in rows of the encrypted column 110, and other suitable database statistics that may be used for estimating a cost associated with performing an operation on the encrypted column 110. In some embodiments, the TM column processor 156 can be configured to generate a histogram representing the restricted data in the encrypted column 110. For example, the TM column processor 156 may generate a histogram that represents a distribution of values in the encrypted column 110, for instance, by placing the values in various buckets. The TM column processor 156 can also be configured to generate other types of histograms, including, for example, frequency histograms, height-balanced histograms, and hybrid histograms.

The TM column processor 156 can be configured to compare values and other suitable operations on data in the encrypted column 110 in order to generate the statistics 159. For example, the TM column processor 156 can be configured to sort values of the encrypted column 110. In other examples, the TM column processor 156 can be configured to create an index for searching the encrypted column 110. For instance, the TM column processor 156 can create an index comprising a lookup table by adding an entry of pointer for each value of the encrypted column 110 in the lookup table for quickly location of a specified value in the encrypted column 110.

The TM cost estimator 157 can be configured to generate cost estimation data 124 (shown in FIG. 1C) for executing an expression in the trusted machine 152. In certain embodiments, the TM cost estimator 157 is configured to generate cost estimation data 124 using the statistics 159 in response to a costing request 122 (shown in FIG. 1B) received from the untrusted machine 142. The costing request 122 can include an expression including an encrypted value. The TM cost estimator 157 can be configured to provide the encrypted value to the cryptography component 154 for decryption. The cost estimator component 157 can then use the decrypted value received from the cryptographic component 154 for any suitable cost estimation.

In certain embodiments, the cost estimation data 124 can comprise an estimated value of selectivity of the encrypted column 110. The selectivity estimate can comprise a ratio of distinct values to total rows from a row set. The row set can comprise a base table, a view, or be the result of a join. In other embodiments, the cost estimation data 124 can include other suitable types of estimated values. In other embodiments, the cost estimation data 124 can include a cardinality of an operation included in the costing request 122 estimated using the statistics 159. In some embodiments, the TM cost estimator 157 is configured to estimate the cardinality by dividing the total number of rows of the encrypted column 110 by the number of distinct values of the encrypted column 110, as described by the statistics 159.

In other embodiments, the TM cost estimator 157 is configured to estimate the cardinality based at least in part on a histogram associated with the encrypted column 110 in the statistics 159. For example, the TM cost estimator 157 can be configured to use the histogram to estimate the cardinality of a FILTER or JOIN predicate that involves the encrypted column 110. In further embodiments, the TM cost estimator 157 uses a histogram for estimating cardinality when a column is determined to contain a nonuniform distribution of data (i.e., data skew). In yet further embodiments, the TM cost estimator 157 calculates a cardinality estimate for a popular value (i.e., a value that spans two or more endpoints) of a histogram based on a quantity of rows in a table multiplied by a quantity of endpoints spanned by the popular value divided by the total quantity of endpoints, or based on a quantity of rows in a table multiplied by a density of the encrypted column 110.

The TM statement processor 158 can be configured to execute operations of the execution plan as requested by the statement processor 148 at the untrusted machine 142. For example, the TM statement processor 158 can be configured to perform a variety of operations for evaluating an expression such as process operators like, between, <, < >, and so on. In other examples, the TM statement processor 158 can be configured to perform various operations on the encrypted column 110. For instance, the TM statement processor 158 can be configured to perform a PROJECT operation for computing scalar expressions on the encrypted column 110. The statement processor 148 of the untrusted machine 142 can send a set of rows 127 (shown in FIG. 1D) to the trusted machine 152. In response, the TM statement processor 158 can process the rows 127, as instructed by the statement processor 148, and return the same number of rows with additional columns that are the scalar computation results. In some embodiments, the statement processor 148 is configured to transfer all columns to the trusted machine 152 that need processing, including unencrypted columns, and receive all columns back after processing by the TM statement processor 158. In other embodiments, the statement processor 148 is configured to send to the trusted machine 152 a subset of columns needing processing, which includes the encrypted column 110, and logically rejoin rows that are returned from the trusted machine 152 after processing by the TM statement processor 158.

In another example, the TM statement processor 158 can be configured to perform a FILTER operation. For performing a FILTER operation, in some embodiments, the TM statement processor 158 can be configured to perform a PROJECT operation to compute a predicate comprising the FILTER operation, and return a Boolean-valued column to the statement processor 148 of the untrusted machine 142. The statement processor 148 can be configured to perform a standard FILTER operation on the returned column to discard rows. In other embodiments, the TM statement processor 158 is configured to perform a FILTER operation on the Boolean-valued column prior to transmitting the column to the statement processor 148 of the untrusted machine 142. In such an implementation, the TM statement processor 158 can be configured to execute the FILTER operation over non-encrypted columns as well as encrypted columns that have been decrypted by the cryptography component 154.

In further examples, the TM statement processor 158 can also be configured to perform a HASH JOIN operation. In some embodiments, the TM statement processor 158 be configured to perform a hash function on rows received from the statement processor 148. The TM statement processor 158 may then execute a HASH JOIN operation without residual predicates, and compute residual predicates on encrypted columns that are to be joined. In yet further example, the TM statement processor 158 can also be configured to perform a GROUP BY operation. In some embodiments, the TM statement processor 158 is configured to sort rows of an encrypted column 110 and generate a group identifier that identifies groups of equal values of the rows. In some embodiments, if the grouping columns have few distinct values, the TM statement processor 158 can use a hash table to generate a group identifier. The TM statement processor 158 may output group identifiers to the statement processor 148 for grouping and aggregating rows.

In yet other examples, the TM statement processor 158 can also be configured to perform an aggregate computation, which can include computing an average value of an encrypted column 110. For example, the statement processor 148 can be configured to transfer a batch of rows grouped by a group identifier to the trusted machine 152. In response, the TM statement processor 158 of the trusted machine 152 can be configured to perform a stream aggregation, producing one row per group. The trusted machine 152 can then output the one row per group to, for instance, the statement processor 148. In yet further examples, the TM statement processor 158 can be configured to perform ORDER BY operation, to store and retrieve encrypted data in a table that the TM statement processor 158 maintains in a data storage area (not pictured), or other suitable database operations.

In operation, the statement optimizer 146 can identify potential execution plans for processing the database statement 120 by offloading cost estimation for operations of the execution plan that involving encrypted data to the TM cost estimator 157. As shown in FIG. 1A, upon actuation of the submit button 118 by the user 101, the application 112 can be configured to generate the database statement 120 based on the received user input (e.g., "male" and "diabetes," respectively) in the input fields 116a-b. In the illustrated example, the database statement 120 can include instructions for the database server 108 to process for requesting certain patient records 132 associated with the received user input or performing other suitable actions.

The application 112 can also be configured to parameterize an object submitted in the input fields 116a-c in the database statement 120. For instance, in the example shown in FIG. 1A, the database statement 120 can comprise a SQL statement for requesting patient records 132 associated with patients that are in Washington State, have a sex of "male" and an illness of "diabetes," which may be represented as follows:

SELECT *
FROM patients
WHERE state LIKE 'Washington' AND illness LIKE @x
　　AND sex LIKE 'male';
@x=diabetes;

where restricted value, "diabetes" can be encrypted by a cryptography component (not shown) of the application 112. As shown above, the example SQL statement comprises a database command (i.e., select), identification of a table (i.e., patients), table columns (i.e., sate, illness, and sex), and content "Washington," "male," and "@x", where @x is a parameterized value corresponding to "diabetes."

The application 112 can also be configured to encrypt restricted data in the database statement 120 prior to transmitting the restricted data over the computer network 104. The application 112 can be configured to identify whether data for the database statement 120, such as the user input submitted via the input fields 116a-b by the user 101, is restricted. In some embodiments, the application 112 can determine whether data being transmitted is restricted based on a data type of the data. For example, a data type for the input field 116b can be "illness," a known restricted data type. In other embodiments, the application 112 can determine whether data is restricted by association with the input fields 116a-b, indication by the user 101, or other suitable criteria.

The application 112 can then encrypt data determined as restricted data. The application 112 and the trusted machine 152 can participate in a key exchange, for example, during an initialization process for the trusted machine 152. As discussed above, the key exchange can result in the application 112 and the trusted machine 152 gaining access to a CEK used for encrypting and decrypting data of a column in a table of the database 109. As an example, the application 112 can encrypt data in the database statement 120 using the CEK prior to transmitting the database statement 120 to the database server 108.

The database server 108 can be configured to facilitate access to records in the database 109. In the illustrated embodiment, the database server 108 is directly coupled to the database 109. In other embodiments, the database server 108 can facilitate access to the database 109 hosted in a cloud computing facility, a local computing facility, or other suitable facilities. The database 109 can include data in tables containing, for example, the patient records 132. The patient records 132 are example records including information to facilitate certain designed functions of the application 112. In other embodiments, the database 109 can also contain usage records, tax information, pricing records, purchase history records, or other records containing any suitable types of information. As shown in FIG. 1A, the database 109 can store encrypted records 133 in the patient records 132, for example, in an encrypted column illness, for containing values of patient illnesses.

The statement optimizer 146 can then examine the database statements 120 received by the interface component 144 and determine an execution plan for the statement processor 148 to execute. In some embodiments, the statement optimizer 146 identifies multiple execution plans for executing the database statement 120, estimates a cost for executing each of the multiple execution plans, and selects the execution plan associated with the lowest estimated cost for execution. In other embodiments, the statement optimizer 146 can also select an execution plan based on execution speed, execution delay, or other suitable criteria.

The statement optimizer 146 can determine an execution plan based on instructions identified in the database statement 120. For example, the statement optimizer 146 can parse the database statement 120 to identify one or more instructions in the database statement 120. The instructions can comprise, for example, a query for data from the database 109, such as in the example SQL statement above. In some embodiments, the statement optimizer 146 identifies a potential execution plan for executing the database statement 120 that includes a full table scan for accessing data described by the database statement 120. In other embodiments, the statement optimizer 146 can identify a potential execution plan for executing the database statement 120 based on transformations of the database statement 120. For example, the statement optimizer 146 can rewrite the database statement 120 via query transformation into a semantically equivalent statement. Suitable query transformations include OR expansion, view merging, predicate pushing, subquery un-nesting, and so forth.

In certain embodiments, the statement optimizer 146 can identify a potential execution plan based on an examination of possible access paths (e.g., primary index access, secondary index access, full table scan) and various relational table join techniques (e.g., merge join, hash join). For example, the statement optimizer 146 can identify potential execution plans that include different orders in which tables are joined. In other embodiments, an execution plan can include a tree of plan nodes identified based on the database statement 120. The plan nodes each encapsulate a single operation for execution of the database statement 120 and intermediate results flow from the bottom of the tree to the top.

The determined individual execution plans can include various operations for executing the database statement 120. For the example SQL statement above, which comprises a query on table patients including a first LIKE predicate on column state, a second LIKE predicate on column illness, and a third LIKE predicate on column sex, the statement optimizer 146 can, for example, create six execution plans, each with different permutations for evaluating the three predicates.

The statement optimizer 146 can also estimate a cost of executing the database statement 120 according to each potential execution plan. In some embodiments, the statement optimizer 146 estimates a cost for executing the database statement 120 according to the execution plan using a cost model of statement execution. The cost model may consider a cardinality flowing through each edge of a query plan, a selectivity of a predicate of the execution plan, or other suitable cost parameters. The statement optimizer 146 can be configured to use statistics, including histograms, associated with the database 109 and patient records 132, in order to estimate the cost of an execution plan. For example, the statement optimizer 146 can estimate a cardinality of an operation of an execution plan. In some embodiments, cardinality is estimated based on a number of rows in a column relative to a number of distinct values in the column. Cardinality can be used for estimating a cost associated with various operations and functions, such as a join or a sort, or evaluating a predicate. For example, in a nested loops join of two tables, a number of rows in a first table may determine how often the database is likely to probe the second table.

The statement optimizer 146 can estimate a cost for processing the database statement 120 based at least in part on an encrypted data processing cost. In some embodiments, the encrypted data processing cost comprises an estimated cost for offloading processing of encrypted data of the database statement 120 to the trusted machine 152. For example, the encrypted data processing cost can include an estimated cost for evaluating an operation on encrypted data by the trusted machine 152. The operation may be part of an expression comprising encrypted data. For example, the expression can comprise a predicate on the encrypted column 110. In other embodiments, the encrypted data processing cost includes a cost associated with transferring patient records 132 to the trusted machine 146 for processing. For example, the encrypted data processing cost can include an estimated cost associated with each roundtrip transmission of data with the trusted machine 146 and volume of data transferred.

In some embodiments, the statement optimizer 146 can estimate an encrypted data processing cost for an operation that is to be executed by the trusted machine 152 based on an estimated cost associated with performing the operation by the untrusted machine 142. For example, for a PROJECT operation, the PROJECT operator can be split or collapsed with similar PROJECT operations, and moved around other operators subject to relational algebra properties for execution by the trusted machine 152. The statement optimizer 146 can be configured to then estimate a cost of the PROJECT operation in a standard way. For example, the statement optimizer can be configured to follow heuristics for initial placement and perform standard transformation rules, and the statement optimizer 146 can estimate the encrypted data processing cost for executing the PROJECT operation by the trusted machine 152 based on standard costs for the PROJECT operation. In some embodiments, the statement optimizer 146 is configured to build statistics for using in determining the encrypted data processing cost, which can be generated based on observations of actual and/or measured costs associated with executing operations on encrypted data by the trusted machine 152 and/or transferring data to and from the trusted machine 152 for processing.

In some embodiments, the encrypted data processing cost comprises or is derived from cost estimation data received from the trusted machine 146. The statement optimizer 146 can be configured to identify whether an operation of the execution plan includes an operation involving encrypted data, and, in response to determining that the operation does include an operation involving encrypted data, request cost estimation data for executing the operation from the trusted machine 152. For example, an operation involving encrypted data can comprise evaluating a LIKE predicate on an encrypted column.

Figure 1B:
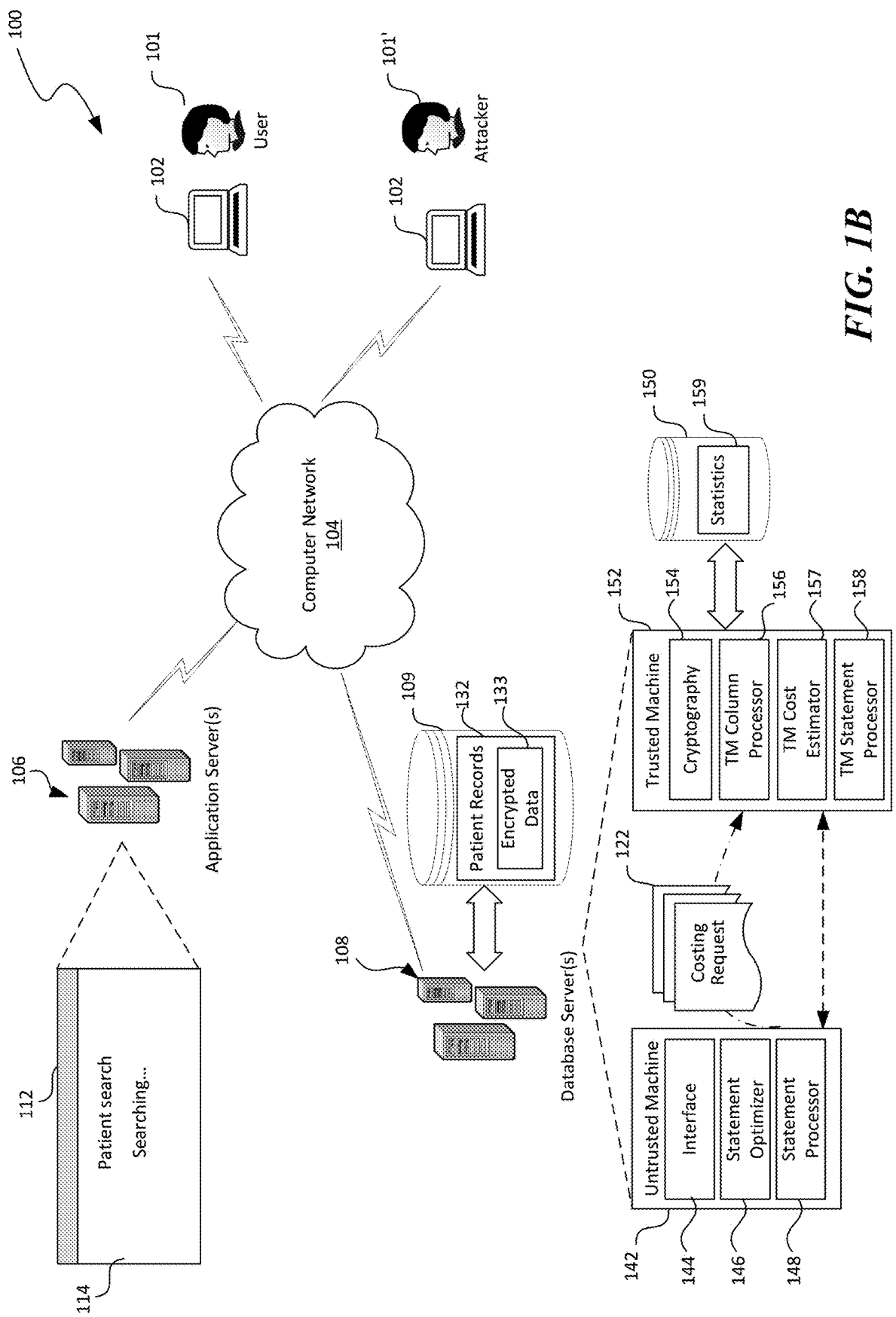

As shown in FIG. 1B, the untrusted machine 142 can provide a costing request 122 to the trusted machine 146, requesting cost information associated with a portion of an execution plan for the database statement 120. The costing request 122 can comprise a portion of the execution plan, such as an operation that involves encrypted data. The costing request 122 can include an identifier for an encrypted column 110 involved in the execution plan and an operation to evaluate with respect to the encrypted column 110. In some embodiments, the costing request 122 includes multiple operations, such as all operations of the execution plan involving encrypted data. The costing request 122 may also include operations of the execution plan that do not involve encrypted data. Referring again to the example SQL statement above, for the costing request 122, the statement optimizer 146 can include, for example, a request for a cardinality estimation and a selectivity estimation associated with the restricted column illness of the table. The statement optimizer 146 can be configured to transmit multiple costing requests 122 for an execution plan. Indeed, the execution plan can comprise multiple operations that include operations on encrypted data, and cost estimation data can be requested for each.

Figure 1C:
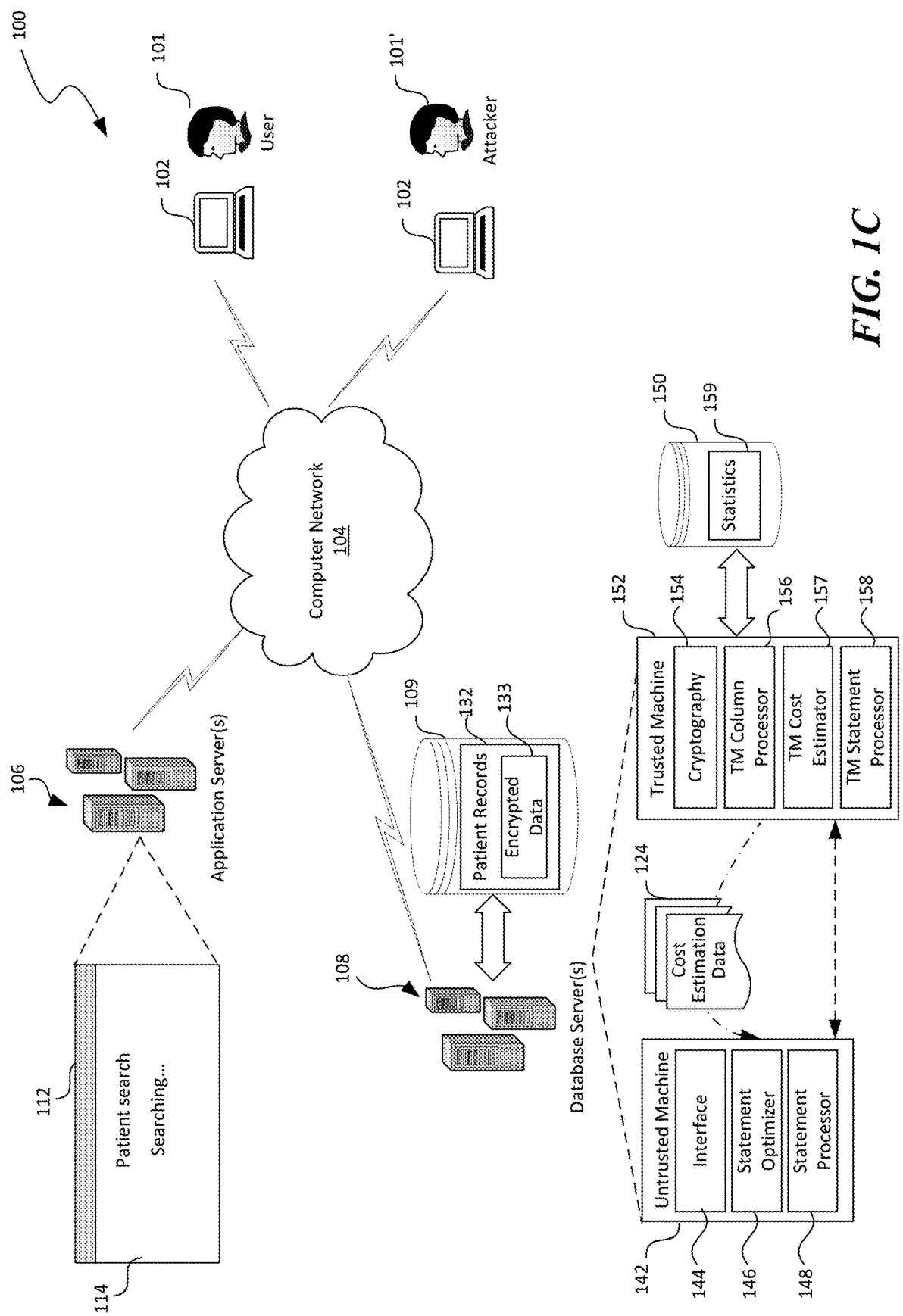

As shown in FIG. 1C, the trusted machine 152 can be configured to provide cost estimation data 124 to the untrusted machine 142 in response to the costing request 122 (FIG. 1B). The TM cost estimator 157 can generate the cost estimation data 124 using the statistics 159. In certain embodiments, the costing request 122 can include an expression including an encrypted value. The TM cost estimator 157 can provide the encrypted value to the cryptography component 154 for decryption, and use the decrypted value for cost estimation.

In certain embodiments, the cost estimation data 124 can comprise a cardinality of an operation included in the costing request 122. In some embodiments, the TM cost estimator 157 can estimate the cardinality by dividing the total number of rows of the encrypted column 110 by the number of distinct values of the encrypted column 110, as described by the statistics 159. In other embodiments, the TM cost estimator 157 can estimate the cardinality based at least in part on a histogram associated with the encrypted column 110 in the statistics 159. For example, the TM cost estimator 157 can use the histogram to estimate the cardinality of a FILTER or JOIN predicate that involves the encrypted column 110. In further embodiments, the TM cost estimator 157 uses a histogram for estimating cardinality when a column is determined to contain a nonuniform distribution of data (i.e., data skew). In yet further embodiments, the TM cost estimator 157 calculates a cardinality estimate for a popular value (i.e., a value that spans two or more endpoints) of a histogram based on a quantity of rows in a table multiplied by a quantity of endpoints spanned by the popular value divided by the total quantity of endpoints. In yet other embodiments, the TM cost estimator 157 calculates a cardinality estimate for a nonpopular value of a histogram based on a quantity of rows in a table multiplied by a density of the encrypted column 110. In other embodiments, the cost estimation data 124 can comprise an estimated selectivity of an encrypted column 110. The selectivity estimate can comprise a ratio of distinct values to total rows from a row set. The row set can comprise a base table, a view, or be the result of a join. The TM cost estimator 157 can estimate selectivity using a histogram of the statistics 159.

Referring again to the example SQL statement above, in response to the costing request 122, the TM cost estimator 157 can calculate cost estimation data 124 associated with the operation in predicate illness LIKE diabetes. For example, in some embodiments, the TM cost estimator 157 may estimate a cardinality of the predicate by dividing the total number of rows for column illness by a quantity of distinct values in the column. If, for instance, a total quantity of rows is 1,000,000 and a quantity of distinct values is found to be 100, the cardinality may be estimated to be 10,000.

The statement optimizer 146 can receive the cost estimation data 124 from the TM cost estimator 157 and calculate an estimated total cost for an execution plan. In certain embodiments, the statement optimizer 146 can generate a total cost estimate for the execution plan according to a cost model employed by the statement optimizer 146. In some embodiments, the statement optimizer 146 can process component costs respectively associated with each operation of the execution plan and normalize the component cost to a cost value estimate based on the cost model. The statement optimizer 146 can then add up a cost value estimate associated with each operation of the execution plan to derive the estimated total cost for the executing plan. For example, an execution plan and calculated costs for the example SQL statement from above can comprise the following:

| [Id] | Operation | Name | Rows | Cost |
|---|---|---|---|---|
| [0] | SELECT STATEMENT | | | 7 |
| [1] | INDEX FULL SCAN | state | 1000 | 7 |
| [2] | TABLE ACCESS SCAN | illness | 9500 | 15 |
| [3] | TABLE ACCESS SCAN | sex | 20000 | 10 |

In the example above, the total cost for the execution plan may be estimated to be 39 by adding component costs associated with each operation of the execution plan. As shown above, the cost associated with executing the operation on encrypted column illness is greater than if the column were not encrypted, because the cost for executing the predicate on the illness column can comprise encrypted data processing costs associated with that operation. In some embodiments, the encrypted data processing cost comprises multiple components, such as the cost estimation data 124 received from the trusted machine 152 and encrypted data processing costs predicted to be associated with transferring rows back and forth between the untrusted machine 142 and the trusted machine 152. Based on the estimated total costs, the statement optimizer 146 can select one execution plan that is associated with, for instance, the lowest estimated cost, and provide the execution plan to the statement processor 148 for execution.

Figure 1D:
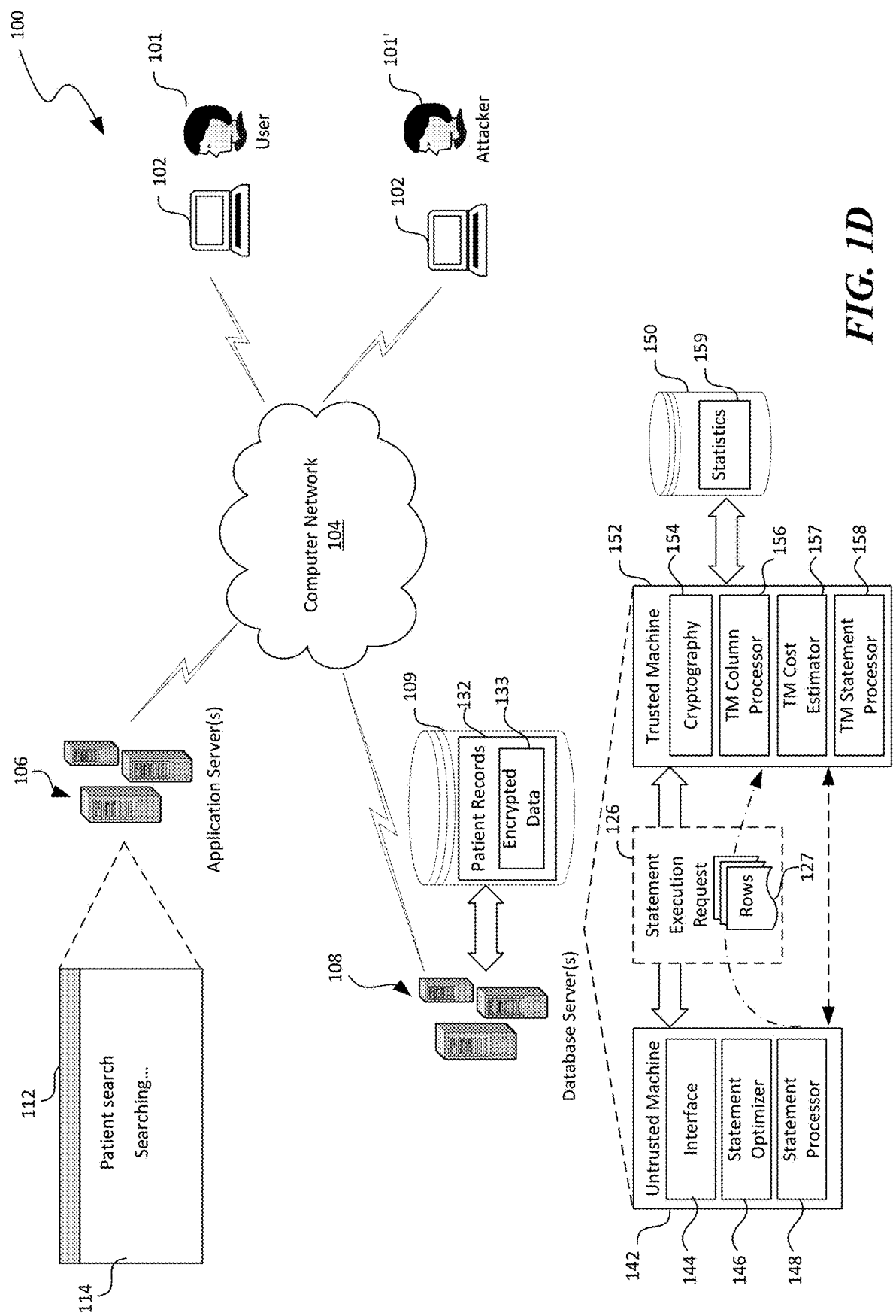
Figure 1E:
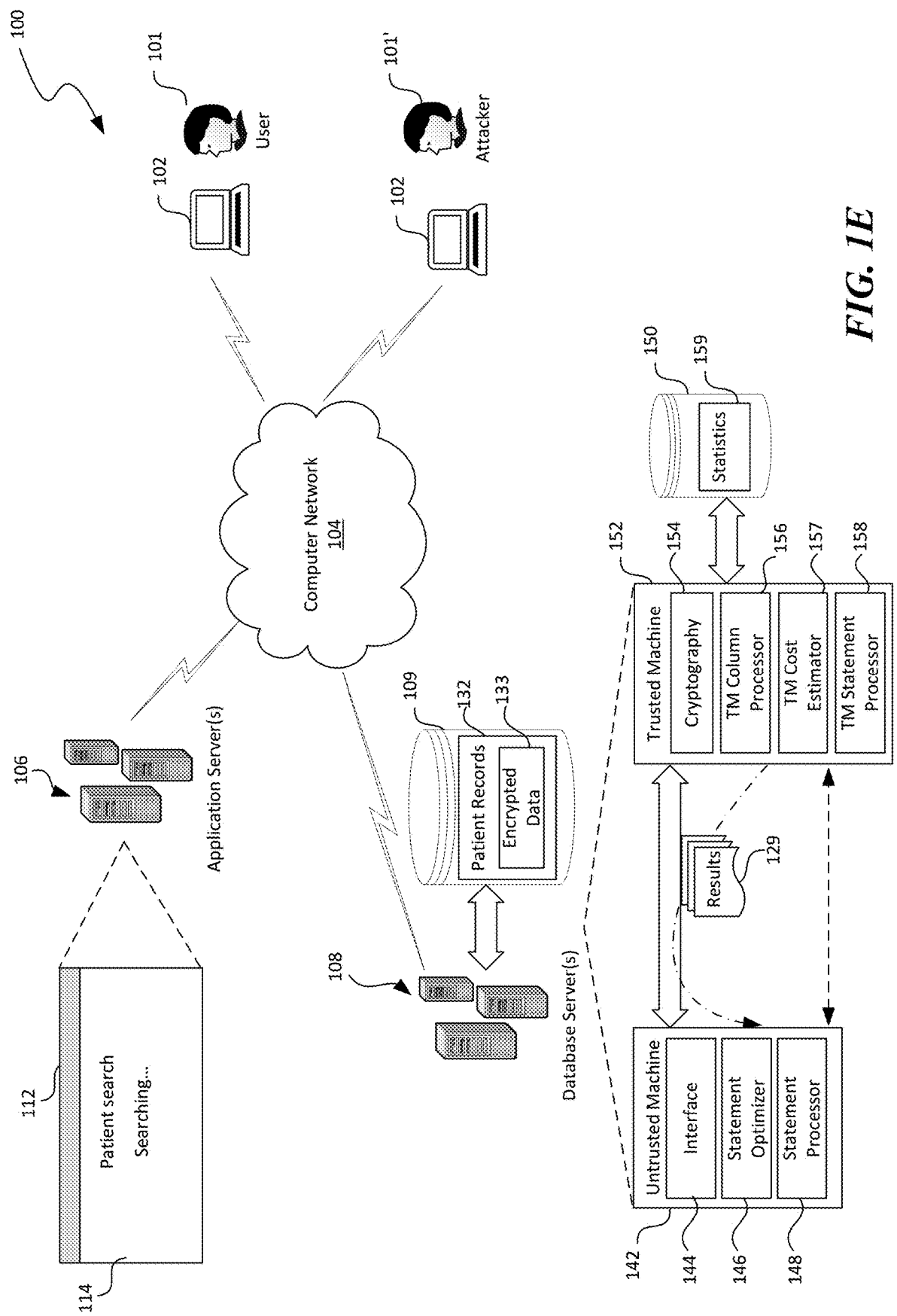

As shown in FIG. 1D, for executing operations related to data in the encrypted column 110, the statement processor 148 can transmit a statement execution request 126 to the TM statement processor 158 along with one or more rows 127 of data in the encrypted column 110. For executing operations, the TM statement processor 158 can request the cryptography component 154 to decrypt data from the encrypted column 110, receive decrypted data from the cryptography component 154, and process the decrypted data according to the statement execution request 126. For example, referring to the example database statement above, the TM statement processor 158 can evaluate "illness LIKE @x," by comparing parameter, @x, whose value is encrypted when received by the trusted machine 152, with values from rows 127 of the illness column of the table patients, which are also encrypted. The encrypted data can be provided to the cryptography component 154, which decrypts the encrypted data and provides the data in plaintext to the TM statement processor 158 for evaluation according to the operations of the execution plan.

Figure 1F:
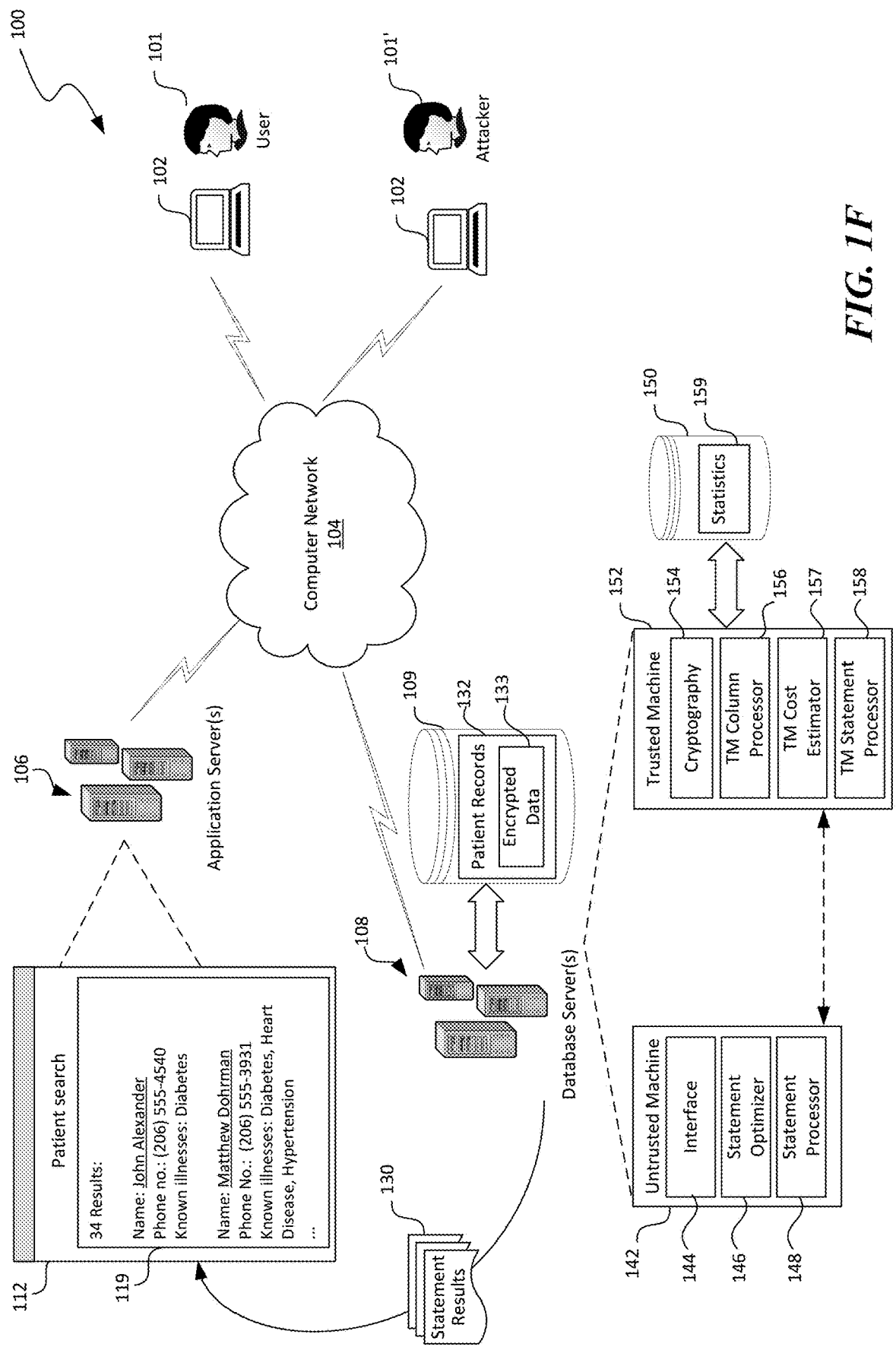

As shown in FIG. 1F, the TM statement processor 158 can then generate results 129 by executing the operations of the execution plan and provide the results 129 to the untrusted machine 142 for further processing. In response to receiving the results 129, the statement processor 148 can complete the operations of the execution plan that do not involve encrypted data using the results 129 for computation to generate statement results 130. The statement results 130 can include the results 129 and/or patient records 132 identified using the results 129. For instance, in response to the example SQL statement, SELECT * FROM patients WHERE state LIKE 'Washington' AND illness LIKE @x AND sex LIKE 'male'; @x=diabetes; where @x is a parameter for cyphertext of illness value diabetes, the statement result 130 can comprise patient records 132 that match the predicates of the SQL statement, including cyphertext corresponding to values from column illness.

In response to receiving the statement results 129, the application 112, can display patient information 119 from the patient records 132 to the user 101. In the illustrated embodiment, the displayed patient information 119 is shown to include names (e.g., "John Alexander"), phone numbers (e.g., "(206) 555-4540"), and illnesses (e.g., "Diabetes") for illustration purposes. In other embodiments, the displayed information 119 can also include any other suitable types of information. The application 112 can be configured to decrypt data in the statement results 130 when the statement results 130 are encrypted. For example, statement results 130 can include encrypted data 133 comprising values from column illness that is contained in the result 129 received from the trusted machine 152. In some embodiments, the application 112 can then decrypt the data using the CEK and provide the decrypted data to the user 101.

Several embodiments of the disclosed technology can thus reduce costs, on average, for executing database statements involving encrypted data. The untrusted machine 152 of the database server 108 can estimate a cost for executing a database statement comprising encrypted data based, at least in part, on an estimated encrypted data processing cost. The trusted machine 152 can be configured to generate statistics related to encrypted columns of the database 109, and the untrusted machine 142 can request a costing estimation from the trusted machine 152 for executing one or more operations of an execution plan which involve encrypted data. The untrusted machine 142 can then generate a total cost estimate for multiple execution plans and select an execution plan for execution that is estimated to result in the lowest cost or according to other suitable criteria. The untrusted machine 142 can then execute the selected execution plan for the database statement, offloading processing of encrypted data to the trusted machine 152. As such, the database server 108 can reduce, on average, costs for processing database statements comprising encrypted data.

Figure 2:
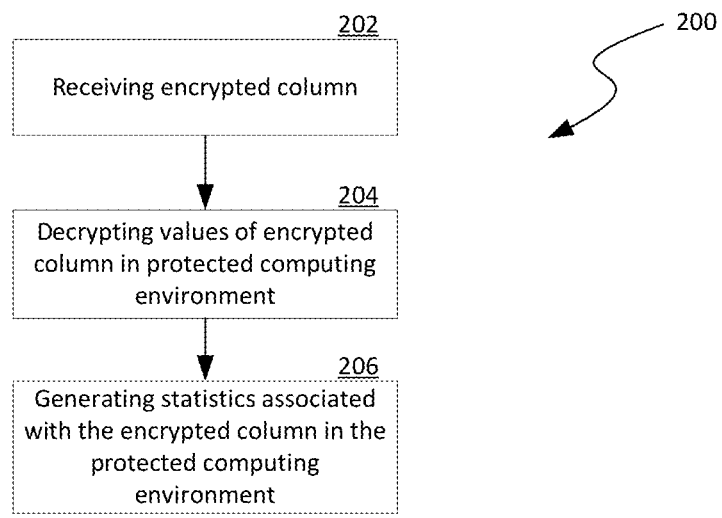
FIG. 2 is a flowchart illustrating a process for generating statistics associated with an encrypted column of a database table in accordance with embodiments of the disclosed technology.

FIG. 2 is a flowchart illustrating a process 200 of generating statistics associated with an encrypted column in accordance with embodiments of the disclosed technology. Even though various embodiments of the processes are described below with reference to the computing system 100 of FIGS. 1A-1F, in other embodiments, the processes can also be performed with other suitable types of computing frameworks, systems, components, or modules.

As shown in FIG. 2, the process 200 can include receiving an encrypted column from an untrusted machine at stage 202. The encrypted column may contain, for example, restricted data encrypted with a CEK. The process 200 can then include decrypting values of the encrypted column in a protected computing environment. For example, a trusted machine may have access to the CEK used for encrypting the values of the encrypted column. The trusted machine can decrypt the values of the encrypted column in the protected computing environment, thereby ensuring that unencrypted data is not revealed to the untrusted machine. The process 200 can then include generating statistics associated with the encrypted column in the protected computing environment. The statistics can include, for example, a quantity of distinct values, a histogram including buckets of values, and so forth. The trusted machine can store the statistics associated with the encrypted column, which it can use for generating costing estimation data related to the encrypted column when requested by the untrusted machine.

Figure 3A:
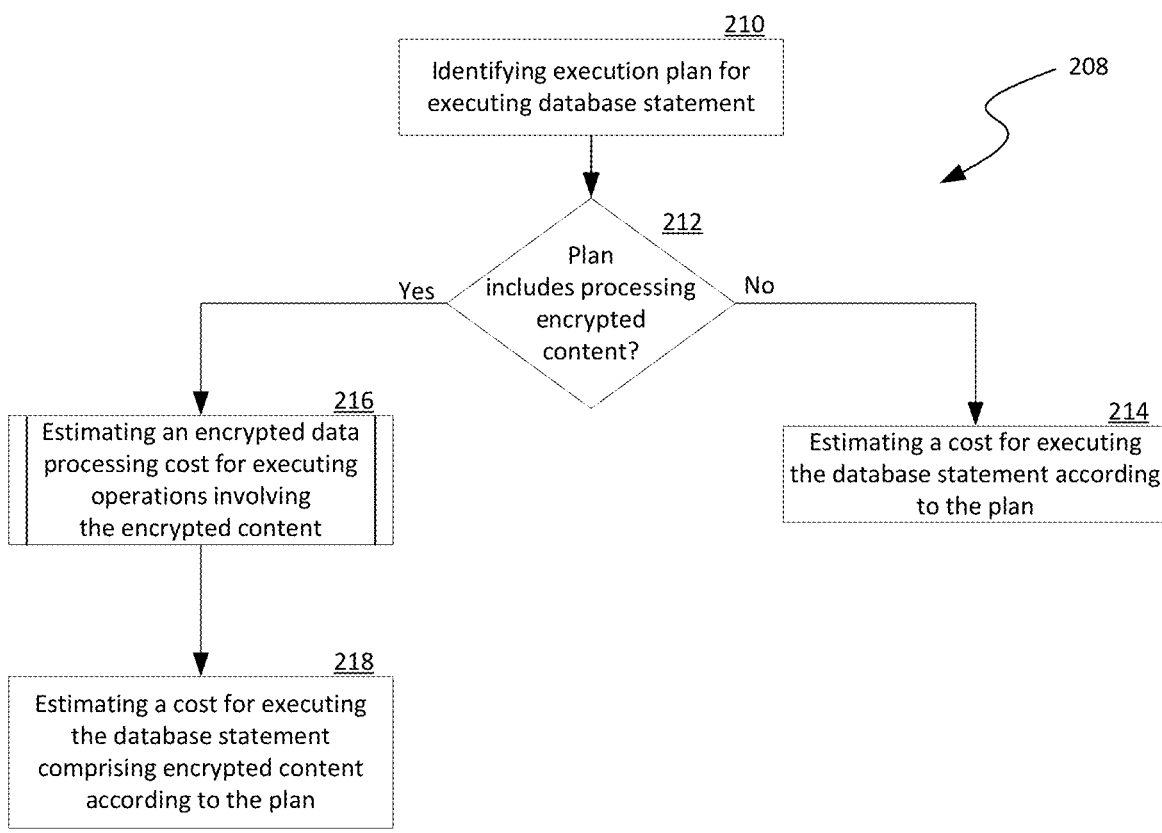
FIGS. 3A-B are flowcharts illustrating various processes of estimating a cost associated with an execution plan for instructions of a database statement in accordance with embodiments of the disclosed technology.

FIG. 3A is a flowchart illustrating a process 208 of estimating a cost for executing an execution plan for a database statement in accordance with embodiments of the disclosed technology. As shown in FIG. 3A, the process 208 can include identifying an execution plan for executing a database statement at stage 210. The execution plan can comprise ordered operations for executing instructions in the database statement.

The process 208 can then include a decision stage 212 for determining whether the execution plan includes processing of encrypted data. For example, the database statement can comprise a predicate on an encrypted column, which is included in the execution plan. When the execution plan does not include processing of encrypted data, the process 208 includes estimating a cost for executing the database statement according to the plan at stage 214. When no encrypted data is involved in the execution plan, the database server can estimate a cost for the execution plan according to conventional methods.

When the execution plan does include processing of encrypted data at decision stage 212, the process can include estimating an encrypted data processing cost for executing an operation involving encrypted data at stage 216. For example, the untrusted machine may estimate the encrypted data processing cost based at least in part on a cost of round trip transmissions of encrypted columns with the trusted machine and processing of the encrypted columns by the trusted machine. As another example, the untrusted machine may request estimated cost data for processing the encrypted data from the trusted machine. The trusted machine may use statistics associated with an encrypted column involved in the execution plan to estimate cost data for executing operations on the encrypted data. For example, the trusted machine may estimate a cardinality of an operation on the encrypted column based on a histogram associated with the encrypted column. After estimating an encrypted data processing cost, the process 208 proceeds to stage 218, and includes estimating a cost for executing the database statement according to the execution plan. In some embodiments, the untrusted machine can estimate a cost for executing the database statement according to the execution plan by adding component costs respectively estimated for executing each operation of the execution plan, which includes the encrypted data processing cost.

Figure 3B:
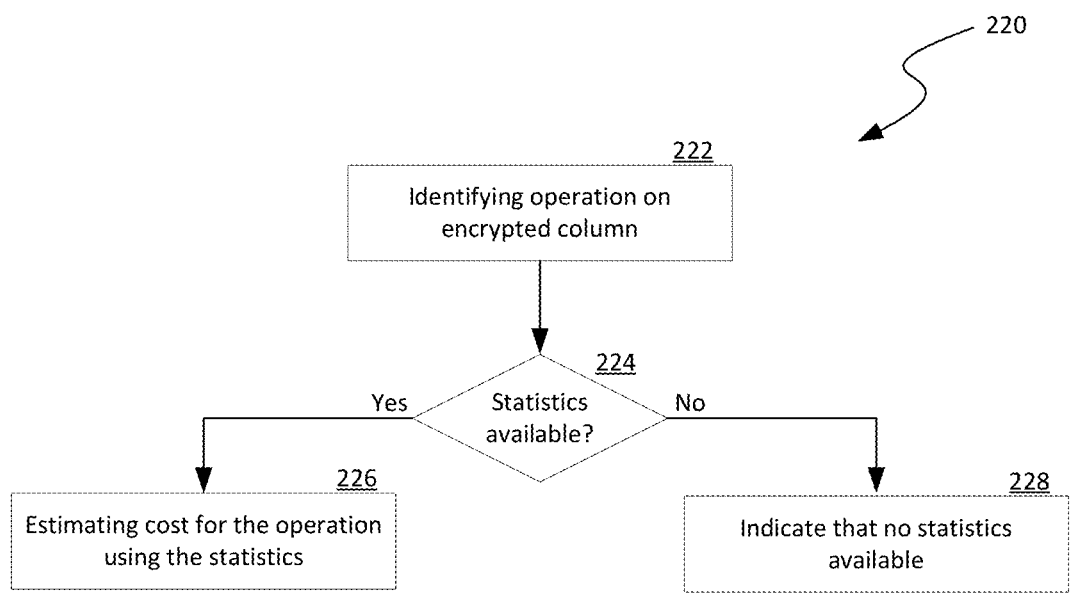

FIG. 3B illustrates example operations of estimating a cost for executing an operation on an encrypted column according to an execution plan for a database statement. A process 220 includes identifying an operation on an encrypted column in an execution plan for a database statement. For example, the trusted machine may receive a request from the untrusted machine to estimate a cost for such an operation. The trusted machine may receive an identifier for the column from the untrusted machine. The process includes a decision stage 224 for determining whether statistics associated with the encrypted column are available. For example, the trusted machine may have received the encrypted column from the untrusted machine previously, which the untrusted machine had accessed in a database. The trusted machine may have built statistics based on the column, such as a histogram representing a distribution of values in the column. When there are no statistics associated with the encrypted column available, the process can include indicating that no statistics are available at stage 228. When statistics are available, the process includes a stage of estimating a cost for executing the operation on the encrypted column at stage 226. For example, the trusted machine may estimate a cardinality of the operation based on the histogram associated with the encrypted column.

Figure 4:
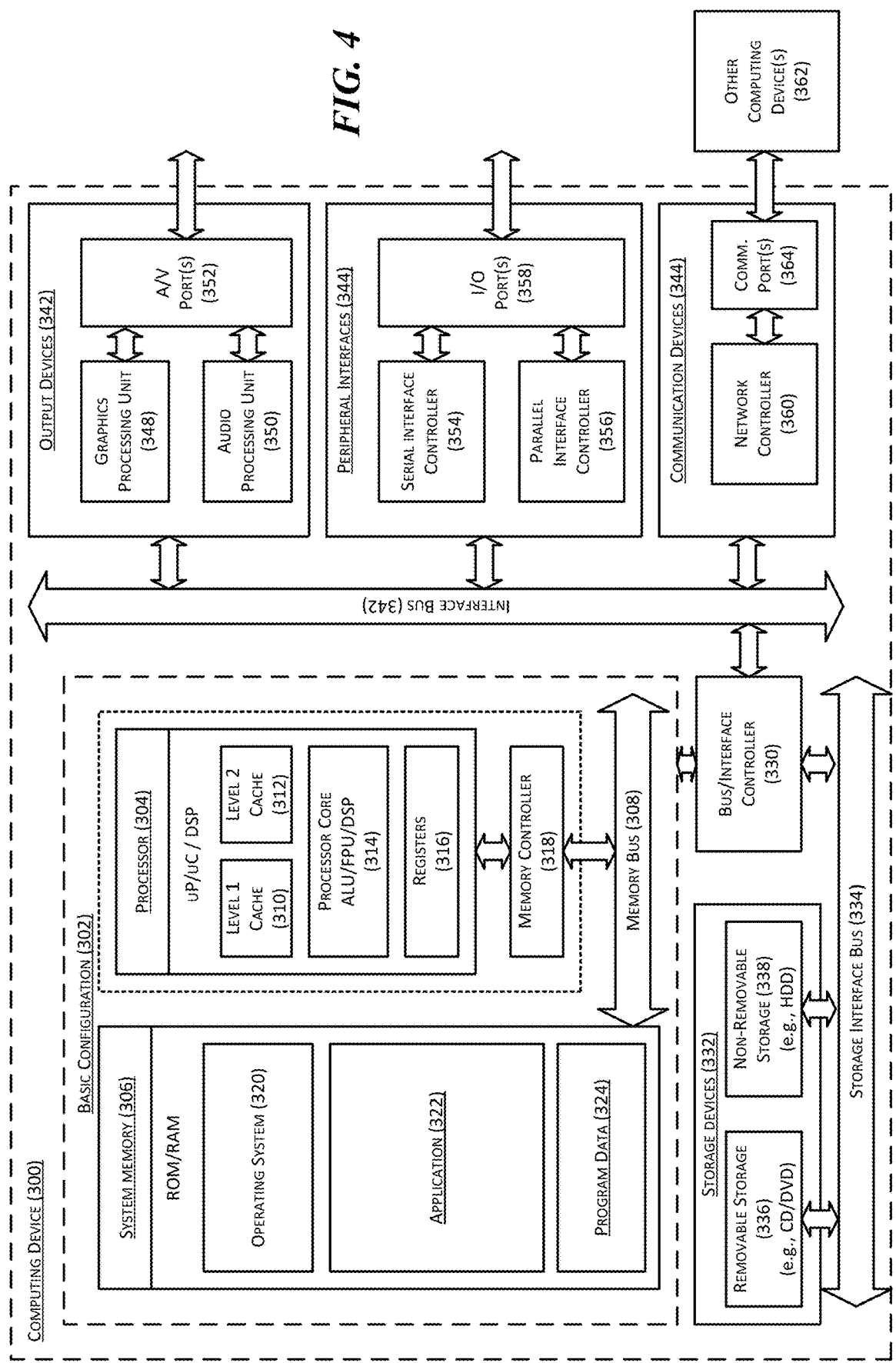
FIG. 4 is a computing device suitable for certain components of the computing system in FIGS. 1A-1C.

FIG. 4 is a computing device 300 suitable for certain components of the computing system 100 in FIGS. 1A-1F. For example, the computing device 300 can be suitable for the application server 106, the database server 108, or the client devices 102 of FIGS. 1A-1F. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more AN ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of executing instructions in a database statement by a database server, the method comprising:
    receiving, via a computer network, data representing a database statement from an application at an untrusted machine on the database server, the database statement including an operation on an encrypted column of a table of a database hosted on the database server;
    in response to receiving the database statement, at the untrusted machine,
        identifying multiple execution plans for executing the database statement, the execution plans each including a distinct sequence of evaluation operations;
        estimating a cost for executing the operations of each of the execution plans, the estimated cost including an encrypted data processing cost associated with evaluating the operation on the encrypted column in a protected computing environment for each of the execution plans, the protected computing environment being operatively coupled to and secure from the untrusted machine on the database server;
        selecting one of the execution plans based on the estimated costs for executing the operations of the execution plans in both the protected and unprotected computing environment and the untrusted machine; and
        executing the selected execution plan on the database server to generate a result to the received database statement and providing the result to the application.

2. The method of claim 1 wherein the encrypted data processing cost comprises a cost of cardinality estimation for the encrypted column of the table in the database in the protected computing environment.

3. The method of claim 1 wherein the encrypted data processing cost comprises a cost of selectivity estimation for the encrypted column of the table in the database in the protected computing environment.

4. The method of claim 1 wherein the encrypted data processing cost comprises an estimated cost associated with transmitting/receiving values of the encrypted column to/from the protected computing environment.

5. The method of claim 1 wherein the encrypted data processing cost comprises a cost of cardinality or selectivity estimation determined based at least in part on statistics of the encrypted column generated in the protected computing environment.

6. The method of claim 1 wherein the encrypted data processing cost comprises a cost of cardinality or selectivity estimation determined based at least in part on a histogram of the encrypted column generated in the protected computing environment.

7. The method of claim 1 wherein executing the execution plan comprises, using a trusted machine in the protected computing environment to:
    decrypt values of the encrypted column in the protected computing environment;
    evaluate the operation on the decrypted values of the encrypted column in the protected computing environment; and
    generate, based on evaluating the operation on the decrypted values of the encrypted column in the protected computing environment, a set of data representing result of the evaluated operation on the decrypted values.

8. The method of claim 7, further comprising using a trusted machine in the protected computing environment to encrypt the set of data representing result of the evaluated operation on the decrypted values prior to transmitting the set of data outside of the protected computing environment.

9. The method of claim 7, further comprising using a trusted machine in the protected computing environment to encrypt the set of data representing result of the evaluated operation on the decrypted values prior to transmitting the set of data outside of the protected computing environment and transmitting at least a portion of the encrypted set of data to the application via the computer network.

10. The method of claim 1 wherein estimating the cost for executing the instructions according to the execution plan comprises:

transmitting a costing request to a trusted machine in the protected computing environment;

receiving the encrypted data processing cost associated with evaluating the operation on the encrypted column in the protected computing environment for each of the execution plans; and deriving a total cost for executing the execution plans based on the received encrypted data processing costs.

11. A method of executing instructions in a database statement by a database server, the method comprising:

receiving, via a computer network, data representing a database statement from an application at an untrusted machine on the database server, the database statement including instructions having an operation on restricted data in an encrypted column in a table of a database hosted on the database server;

in response to the received database statement, at the untrusted machine, identifying multiple execution sequences for executing the instructions of the received database statement;

estimating a cost for executing the instructions according to each of the multiple execution plans, the respective estimated cost comprising an estimated cost for evaluating the operation on the encrypted data in a protected computing environment that is operatively coupled to and secure from the untrusted machine on the database server;

comparing the respective estimated costs for executing the instructions according to each of the multiple execution plans;

identifying, based on the comparison of the respective estimated costs, a lowest cost execution plan for executing the operations of the execution plans in both the protected computing environment and the untrusted machine; and in response to identifying the lowest cost execution plan, executing the lowest cost execution plan on the database server.

12. The method of claim 11 wherein the estimated cost for evaluating the operation on the encrypted data in the protected computing environment comprise a cost of performing cardinality estimation in the protected computing environment.

13. The method of claim 11 wherein the estimated cost for evaluating the operation on the encrypted data in the protected computing environment comprise a cost of transmitting values of the encrypted column to the protected computing environment.

14. The method of claim 11 wherein the operation is a scaler operation on the encrypted column.

15. The method of claim 11 wherein:

the operation on the encrypted data comprises a predicate; and each of the multiple execution plans comprise a different order of evaluating multiple predicates include the predicate associated with the operation on the encrypted data.

16. A computing device interconnected with an application server via a computer network, the computing device comprising:

a processor and a memory containing instructions executable by the processor to cause the computing device to:

receive, via a computer network, data representing a database statement from an application at an untrusted machine on the computing device;

identify instructions in the received database statement, the instructions including an operation on an encrypted column of a database table;

identify an execution plan for executing the instructions, the execution plan including evaluating the operation on the encrypted column in a protected computing environment that is operatively coupled to and secure from the untrusted machine on the computing device;

estimate a cost for executing the instructions according to the execution plan, the cost including an encrypted data processing cost associated with evaluating the operation on the encrypted column in the protected computing environment;

select the execution plan for executing the instructions based on the estimated cost for executing the instructions according to the execution plan in both the protected computing environment and the untrusted machine; and execute the execution plan to generate a result to the received database statement and providing the result to the application.

17. The computing device of claim 16 wherein the encrypted data processing cost comprises a cost of cardinality estimation for the encrypted column of the table in the database in the protected computing environment.

18. The computing device of claim 16 a cost of selectivity estimation for the encrypted column of the table in the database in the protected computing environment.

19. The computing device of claim 16 wherein to execute the execution plan comprises, in the protected computing environment to:

decrypt values of the encrypted column in the protected computing environment;

evaluate the operation on the decrypted values of the encrypted column in the protected computing environment; and generate, based on evaluating the operation on the decrypted values of the encrypted column in the protected computing environment, a set of data representing result of the evaluated operation on the decrypted values.

20. The computing device of claim 16 wherein to estimate the cost for executing the instructions according to the execution plan comprises:

to transmit a costing request to a trusted machine in the protected computing environment;

to receive the encrypted data processing cost associated with evaluating the operation on the encrypted column in the protected computing environment for each of the execution plans; and to derive a total cost for executing the execution plans based on the received encrypted data processing costs.

* * * * *